United States Patent
Tajima et al.

[11] Patent Number: 5,429,487
[45] Date of Patent: Jul. 4, 1995

[54] APPARATUS FOR MAKING SHEET ELASTOMERS MIXED WITH SHORT FIBERS

[75] Inventors: Yoshitaka Tajima; Yasuhiro Jinnai, both of Kobe, Japan

[73] Assignee: Bando Chemical Industries, Ltd., Kobe, Japan

[21] Appl. No.: 120,528

[22] Filed: Sep. 14, 1993

[30] Foreign Application Priority Data

Sep. 24, 1992 [JP] Japan .................. 4-254843

[51] Int. Cl.⁶ ................ B29C 47/88; B29C 47/34
[52] U.S. Cl. ................... 425/72.1; 264/108; 264/146; 264/211.13; 425/308; 425/315; 425/404
[58] Field of Search ............. 425/72.1, 308, 315, 425/404; 264/146, 108, 211.13

[56] References Cited

U.S. PATENT DOCUMENTS

| | | | |
|---|---|---|---|
| 2,421,132 | 5/1947 | Tornberg | 425/308 |
| 2,987,765 | 6/1961 | Cichelli | 425/326.1 |
| 3,090,991 | 5/1963 | Hathaway | 264/146 |
| 3,469,282 | 9/1969 | Barnes | 264/564 |
| 3,591,895 | 7/1971 | Britt et al. | 425/72.1 |
| 4,176,155 | 11/1979 | Heisterkamp et al. | 425/72.1 |

FOREIGN PATENT DOCUMENTS 4-80013  3/1992  Japan .

*Primary Examiner*—Jay H. Woo
*Assistant Examiner*—Robert B. Davis
*Attorney, Agent, or Firm*—Sixbey, Friedman, Leedom & Ferguson; Gerald J. Ferguson, Jr.; Tim L. Brackett

[57] ABSTRACT

A tubular extruder for extruding an elastomeric material mixed with short fibers into a tubular form, with the short fibers circumferentially oriented, a cutter for axially cutting the tubular elastomer, and a development unit for developing the tubular elastomer with a longitudinal slit into a flat form are provided. Arranged between the extruder and the cutter is a guide unit used to guide the tubular elastomer with the help of its tubular section. Air is blown off from the tubular section of the guide unit whereby the tubular elastomer is cooled while at the same time its shrinkage in the circumferential direction is suppressed. The ununiformity of shrinkage is avoidable and the disorientation of short fibers is prevented. Further, the occurrence of flare is prevented by adjusting the tilt angle of the development unit so as to make a distance from a cut point to each lateral edge point at which the tubular elastomer begins to develop into a flat form equal to a distance from a particular point on the circumference of the tubular elastomer opposite the cut point to a middle end point of the tubular elastomer at which the tubular elastomer begins to develop into a flat form.

2 Claims, 4 Drawing Sheets

APPARATUS FOR MAKING SHEET ELASTOMERS MIXED WITH SHORT FIBERS

BACKGROUND OF THE INVENTION

This invention pertains to apparatus for making sheet-like elastomers mixed with short fibers.

Japanese Unexamined Patent Application No. 4-80013 discloses a device for making short-fiber-containing elastomers (FIG. 3). This apparatus has an expanding die 1 formed by an external die 1A and an internal die 1B together defining an annular area, and an enlarging adapter 3. The apparatus further includes a screw pin 4 which connects the external die 1A and the internal die 1B, a washer 6, and a nut 5.

The expanding die 1A extrudes an elastomeric material E mixed with short fibers into a tubular form wherein the short fibers are oriented in the circumferential direction. The enlarging adapter 3 circumferentially enlarges the elastomer thus extruded. As a result, a tubular elastomer Ep with high circumferential orientation is made and converted into a sheet-like elastomer Es. Such conversion is described. A cutter 10a is provided at an outlet end of the enlarging adapter 3. The cutter 10a continuously slits the oncoming tubular elastomer Ep in the axial direction. A development unit 20a spreads out the tubular elastomer Ep with a longitudinal slit through it thereby forming a sheet-like elastomer Es. This development unit 20a is formed by arranging many conveyers in such a way that they are tangent to a semicircle at their leading ends while they are tangent to a plane at their trailing ends.

The above-described technique, however, presents several drawbacks. The orientation of each short fiber F is in disorder (i.e. out of anti-grain orientation). As seen from FIG. 4, the orientation of each short fiber F is advanced at the middle region of the sheet-like elastomer Es while on the other hand the orientation is delayed at each lateral edge region. The orientation of each short fiber F results in arcing. Taking d=the maximum width of the short fiber's F are and W=the width of the sheet-like elastomer Es, d/W is about 0.07 to 0.15. When such a sheet-like elastomer Es is cut later, this will give rise to the flare of each lateral edge region as shown in FIG. 5.

The above presents another problem. For example, when making tubular belts from the prior art sheet-like elastomer, its base rubbers results in having different lengths. For this reason, it is not advantageous to manufacture tubular belts with such a conventional material. Particularly, it is impossible to get the leading and trailing ends of a sheet-like elastomer butted against each other. Butt Joints are not available.

Even if the aforesaid difficulties are overcome by increasing the number of manufacturing steps, this will present another difficulty. That is, when spinning a post-vulcanization tubular belt hung over a roll-like jig for engraving, the tubular belt will not be secured over the roll-like jig because the orientation of fibers in a base rubber is in disorder, resulting in moving backwards or forwards over the roll-like jig. For this reason, it is hard to form a V-shaped belt. To cope with this problem, it will become necessary to secure a tubular belt to a roll-like. jig. This means that the processing becomes complicated.

Additionally, since the orientation of short fibers is in disorder, this seriously affects the quality of elastomer products.

The reason for these problems has been investigated and the following come to be known. For the case of extrusion by means of so-called anti-grain orientation in which short fibers are oriented circumferentially, the pressure of rubber at the time of extrusion, which varies depending upon the Mooney viscosity of the rubber, the temperature of the rubber, the thickness of a desired sheet-like elastomer, the velocity of extrusion, usually reaches 300 kg/cm². The temperature at a die outlet end goes beyond 100° C. Such a pressured rubber (i.e. 300 kg/cm²) is released all at once into atmospheric air and at the same time the contained short fibers are oriented circumferentially. Under such situation, the sheet-like elastomer is cut by means of a cutter, as a result of which sudden stress relaxation will occur. Such stress relaxation occurs pronouncedly at a particular point (i.e. at a point at which a sheet-like elastomer is cut at a later manufacturing step), which causes serious shrinkage in the circumferential direction as well as in the extrusion direction. Meanwhile, the degree of stress relaxation then is low at a point on the circumference (i.e. at the middle of the sheet-like elastomer) opposite the cut point. Such a cut tubular elastomer whose temperature is about 100° C. is pulled out by the development unit 20a in order to avoid heat-distortion, thereafter being cooled and developed into a flat form. However, due to the above-described difference in the degree of stress relaxation, the orientation of short fibers is advanced at the middle and while it is delayed at the lateral edge, as described previously with reference to FIG. 4.

Furthermore, when a tubular elastomer is cut and developed into a flat form (see FIG. 6), a distance L2 (i.e. a distance from a cut point to one lateral edge region point at which the tubular elastomer becomes flat) and a distance L3 (i.e. a distance from the cut point to the other lateral edge region point at which the tubular elastomer becomes flat) are longer than a distance L1 from a point on the circumference of the tubular elastomer opposite the cut point to the middle end point at which the tubular elastomer becomes flat. These three different distances L1, L2, and L3 become equal only when they are infinite. Practically, the distance restrictions occur, and the difference in length is inevitable.

The present invention is made in an effort to overcome the above-mentioned problems in the prior art techniques. It is a general object of the present invention to provide an improved apparatus in which, while keeping a tubular elastomer extruded from an outlet in a tubular form, uniform stress relaxation grows in the circumferential direction. At the time when such stress relaxation disappears, the tubular elastomer is subjected to the process of cutting. Optionally, in a process during which a tubular elastomer becomes a sheet-like elastomer, the difference in length described above is canceled. In this way, the orientation of short fibers contained in a sheet-like elastomer is unified.

DISCLOSURE OF THE INVENTION

The present invention provides apparatus for making sheet-like elastomers mixed with short fibers. This apparatus includes (a) a tubular extruder for extruding an elastomeric material mixed with short fibers into a tubular form, with the short fibers oriented in a given direction; (b) a tubular guide unit which has a tubular section for guiding the tubular elastomer extruded out of the tubular extruder and an air blow section through which air is fed between the periphery of the tubular section and the inner surface of the tubular elastomer; (c) an air feed unit for feeding the tubular guide unit with air; (d) a cutter for axially continuously cutting the tubular elastomer fed via the air feed unit; and (e) a development unit with a guide surface for developing the tubular elastomer that has been cut by the cutter into a flat form.

In accordance with the present invention, it is so designed that a tubular elastomer is not subjected to the process of cutting immediately it is extruded from the extruder. The tubular elastomer is guided by the tubular guide unit, during which circumferential stress relaxation is not serious. Even if shrinkage occurs, it is scattered evenly over the entire tubular elastomer. Additionally, the blow of air from an outer tubular member of the guide unit allows the tubular elastomer to be guided without producing any friction against the outer tubular member. Further, since the entire tubular elastomer is pressed outwardly by the compressed air, this prevents the tubular elastomer from shrinking in the circumferential direction. Furthermore, during the tubular elastomer being guided, it is cooled rapidly. This prevents stress relaxation from growing. The ununiformity of shrinkage is avoidable thereby preventing the disorientation of short fibers. The orientation of short fibers becomes stable.

It is possible to adjust an angle defined between the tubular elastomer and the guide surface of the development unit in order to make a distance from a cut point at which the cutter cuts the tubular elastomer to each lateral edge point at which the tubular elastomer begins to develop into a flat form equal to a distance from a particular point on the circumference of the tubular elastomer opposite the cut point to a middle end point of the tubular elastomer at which the tubular elastomer begins to develop into a flat form.

Accordingly, the region of each lateral edge point and the region of the middle end point of the tubular elastomer under development into a flat form are equally tensioned. The occurrence of flare is prevented, accordingly.

Further, it is possible to make the feed rate of said development unit variable from the same rate as the extrusion rate of the extruder to a rate 1.10 times the extrusion rate of the extruder.

Accordingly, a tubular elastomer can be developed into a flat form without undergoing serious tension. The uniformity of thickness is obtained. The foregoing d/W is improved to 0.00 to 0.01.

PREFERRED EMBODIMENT OF THE INVENTION

Figure 1:
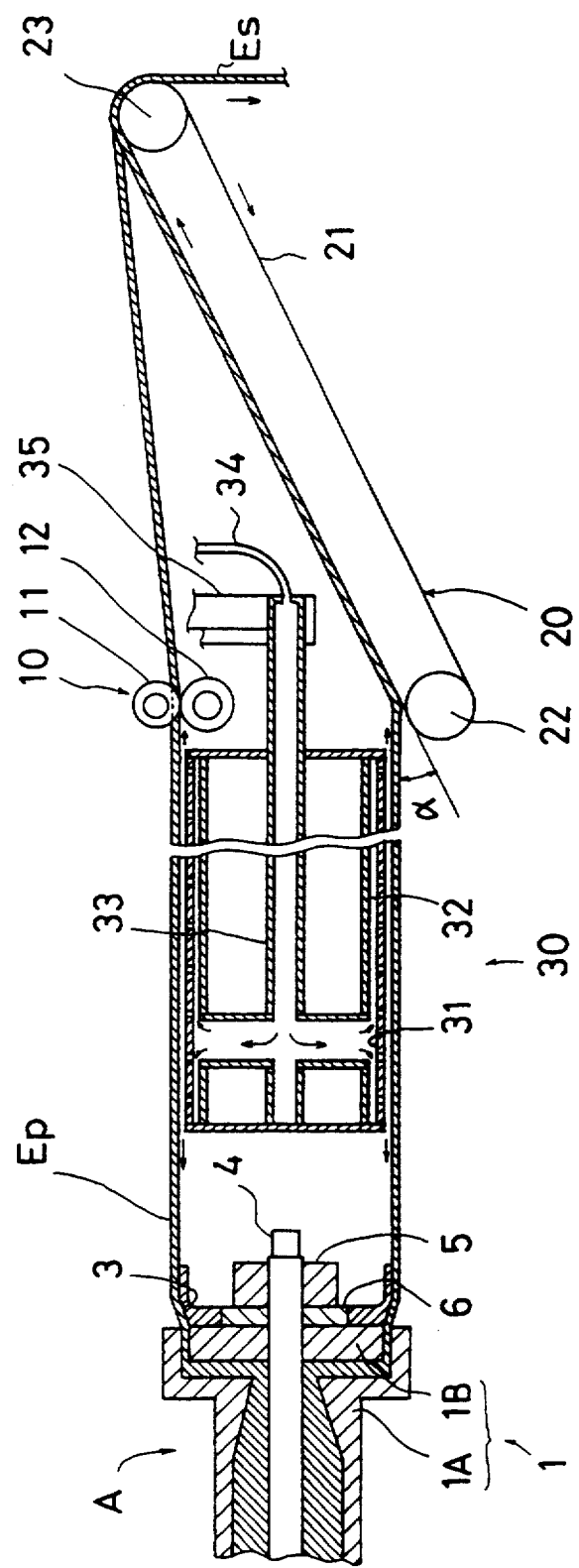
FIG. 1 is a view in longitudinal cross section showing an apparatus for making a short-fiber-containing elastomer sheet in accordance with the present invention.
Figure 2:
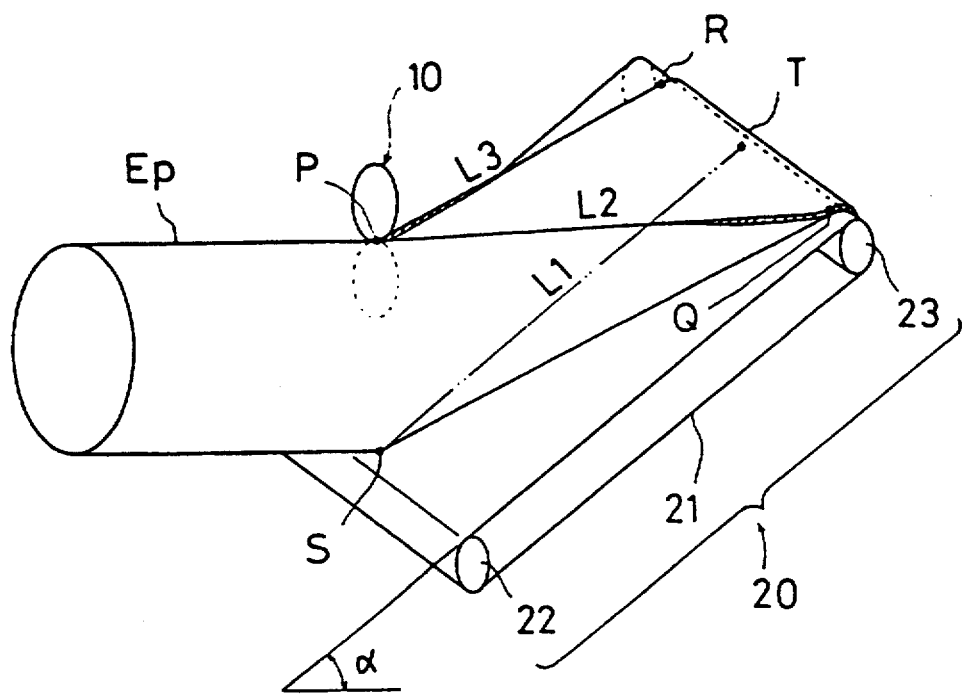
FIG. 2 is a perspective view showing the relationship between a distance from a particular point to each lateral edge point and another distance from a particular point to a middle end point of a tubular elastomer under development.
Figure 3:
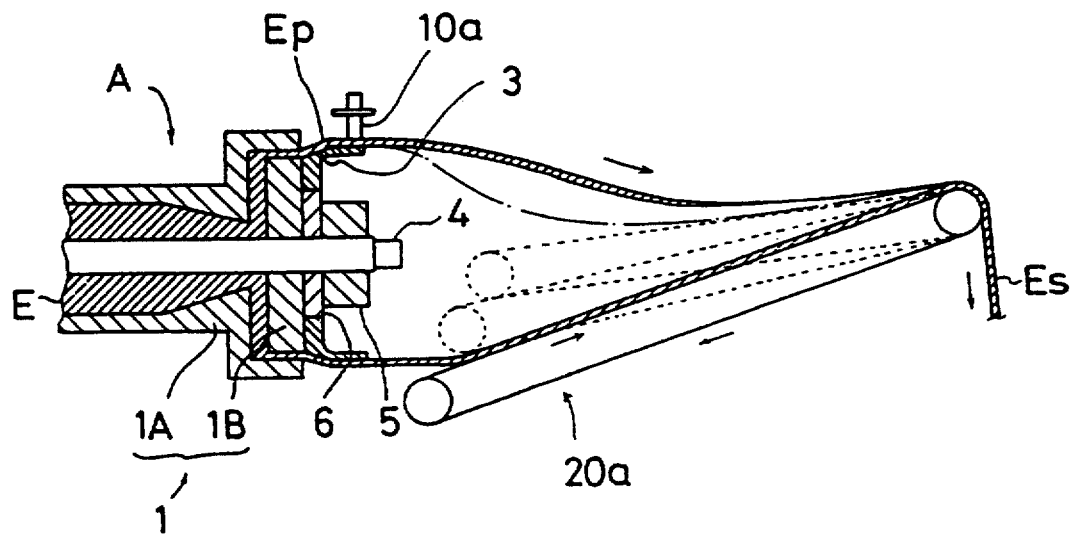
FIG. 3 is a view in longitudinal cross section showing a conventional apparatus for making a short-fiber-containing elastomer sheet.
Figure 4:
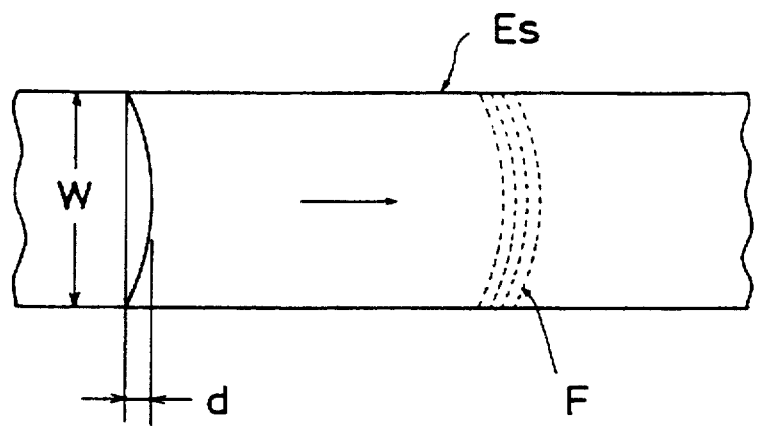
FIG. 4 is a view showing the disorientation of short fibers contained in a conventional short-fiber-containing elastomer sheet.
Figure 5:
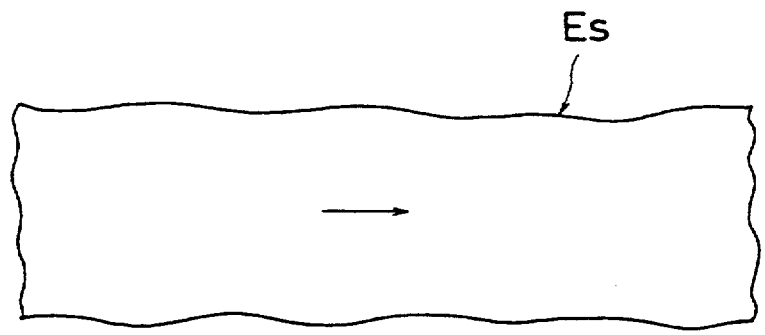
FIG. 5 is a view showing the occurrence of flare at a lateral edge region of a conventional short-fiber-containing elastomer sheet.
Figure 6:
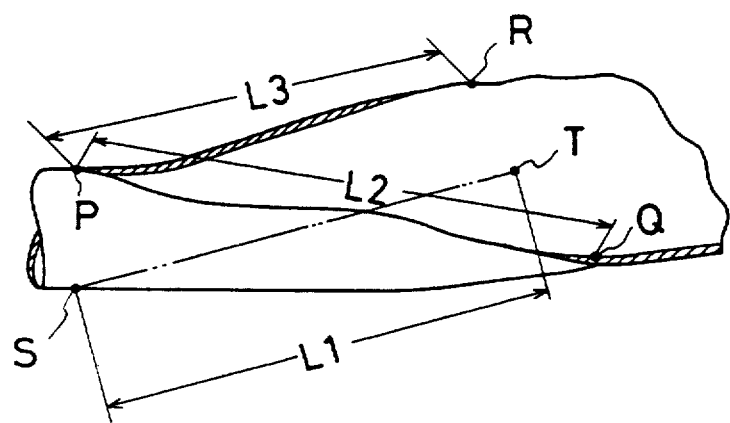
FIG. 6 is a perspective view showing a length difference.

Now referring to FIGS. 1 and 2, an example of the present invention is described. FIG. 1 illustrates an apparatus for making a sheet-like elastomer in accordance with this example. This apparatus has a conventional extruder A (see FIG. 3). With this apparatus, a mixed rubber E as a result of mixing such elastomers as chloroprene rubber with short fibers is extruded by the extruder A into a tubular form and the resulting tubular-shaped mixed rubber E is enlarged. As a result, a tubular elastomer Ep is formed, with the short fibers oriented circumferentially.

Provided on the outlet of the extruder A is a tubular guide unit 30. This tubular guide unit 30 comprises an outer tubular member 31 having an outside diameter slightly smaller than the inside diameter of the tubular elastomer Ep extruded from the outlet of the extruder A, an inner tubular member 32 that is spaced a given gap from the outer tubular member 31, an air feed passage 33 for the supply of air to that gap defined between the two tubular members 31 and 32, an air supply pipe 34 that connects the air feed passage 33 and an air compressor (not shown), and a supporting member 35. The gap defined between the outer tubular member 31 and the inner tubular member 32 is fed compressed air, thereby letting the compressed air blow off through many fine openings provided in the wall of the outer tubular member 31. A constant gap is defined between the tubular elastomer Ep and the outer tubular member 31 so as to guide the tubular elastomer Ep. In other words, the shrinkage of the tubular elastomer Ep caused by stress relaxation is prevented by outwardly applying pressure by the compressed air and by keeping at the same time the tubular elastomer Ep extruded out of the extruder A in a tubular form.

If $L/D \geq \frac{2}{3}$ where L and D are the length and the width of a double tube of the tubular guide unit 30, respectively, the effect of cooling (i.e. the reduction of stress relaxation after the process of cutting) can be obtained.

Additionally, a cutter 10 with an upper round blade 11 and a lower round blade 12 is provided at the outlet of the tubular guide unit 30. The cutter 10 is used to continuously axially slit a particular point on the circumference of the oncoming tubular elastomer Ep guided by the tubular guide unit 30. The reason for employing a round blade in the present example is that it is hard for such cutting means as a knife to cut a short-fiber-contained elastomer whose temperature is low (50° C. to 60° C.). Additionally, both the blades 11 and 12 are heated.

Provided behind the cutter 10 is a conveyer 20 serving as a development device in which a sheet-like belt 21 is wound around a pair of rollers 22 and 23. The sheet-like belt 21 is arranged in such a way that it is brought into contact with the tubular elastomer Ep at a particular point on the circumference of the tubular elastomer Ep (i.e. point S of FIG. 2) opposite a cut point (i.e. point P) at which the tubular elastomer Ep is cut by the cutter 10. Having being cut, the tubular elastomer Ep is received by the conveyer 20, pulled by friction force, and gradually developed into a flat form.

An angle α defined by the guide surface of the sheet-like belt 21 of the conveyer 20 and the tubular elastomer Ep is adjustable by means of an adjustment mechanism (not shown). The diameter of the tubular elastomer Ep determines the angle α. In this example, as shown in FIG. 2, the angle α is determined so that the equation of L2=L3=L1 holds where L2 and L3 are distances from cut point P, at which the cutter 10 starts cutting the tubular elastomer Ep, to lateral leading edge points R and Q of the tubular elastomer Ep from which points the tubular elastomer sheet Ep begins to develop into a flat form and L1 is a distance from point S on the circumference of the tubular elastomer Ep opposite cut point P to middle end point T of the tubular elastomer Ep from which points the tubular elastomer sheet Ep begins to develop into a flat form. With such arrangement, the region of points R and Q and the region of point T are held in equal tension, and the ununiformity of shrinkage due to stress relaxation is canceled.

The feed rate of the conveyer 20 is variable from the same rate as the extrusion rate of the extruder A to a rate 1.10 times the extrusion speed of the extruder A. The reason for this is to reduce to a minimum the application of tension to the tubular elastomer Ep until it will have been developed into a flat form.

In accordance with the present example, it is so designed that the tubular elastomer Ep is not subjected to the process of cutting immediately it is extruded by the extruder A. The tubular elastomer Ep is guided by the tubular guide unit 30, during which circumferential stress relaxation is not serious. Even if shrinkage occurs, it is scattered evenly over the entire tubular elastomer Ep. Additionally, the blow of air from the outer tubular member 31 allows the tubular elastomer Ep to be guided without producing any friction against the outer tubular 31. Further, since the entire tubular elastomer Ep is pressed outwardly by the compressed air, this prevents the tubular elastomer Ep from shrinking in the circumferential direction. Furthermore, during the tubular elastomer Ep being guided, the tubular elastomer Ep is fed compressed air until the process of cutting begins. The tubular elastomer Ep is cooled rapidly down to 50° C. to 60° C. in this example. The tubular elastomer Ep will undergo less stress relaxation after being cut.

In accordance with the invention, the ununiformity of shrinkage is avoidable and the orientation of short fibers is in order. The orientation of short fibers becomes stable, and the quality of products made from short-fiber-containing elastomers of the present invention is improved.

Further, the conveyer 20 is arranged so that the tubular elastomer Ep is moved upwardly from point S opposite cut point P. As described previously, the angle α is determined so as to make the equation of L2=L3=L1 hold, as a result of which the lateral edge region and the middle region of the tubular elastomer Ep under development into a flat form are in equal tension. The flare of lateral edge regions is prevented.

The feed rate of the conveyer 20, as described above, is variable, because of which the application of tension to the tubular elastomer Ep under development into a flat form can be reduced to such an extension that the affect of such tension is negligible. The uniformity of elastomer sheet thickness is obtained. For example, the variation in sheet thickness in the prior art technique is about ±0.3 mm, whereas in the present invention it is reduced down to about ±0.1 mm.

Since the characteristic of elastomer sheets is improved, this produces several advantages over the prior art techniques. For the case of transmission belts utilizing elastomeric materials of the present invention, snaking is reduce to a minimum. The quality of short-fiber-containing elastomer products is improved. Additionally, the above-described problem as to the process of grinding can be canceled.

The invention claimed is:

1. Apparatus for making a sheet elastomer mixed with short fibers, said apparatus comprising:
   (a) a tubular extruder for extruding an elastomeric material mixed with short fibers into a tubular form, with the short fibers oriented in a given direction,
   (b) a tubular guide unit which has a tubular section for guiding the tubular elastomer extruded out of said tubular extruder and an air blow section through which air is fed between the periphery of said tubular section and the inner surface of the tubular elastomer,
   (c) an air feed unit for feeding said tubular guide unit with air,
   (d) a cutter for axially continuously cutting the tubular elastomer fed via said air feed unit, and
   (e) a development unit with a guide surface for developing the tubular elastomer that has been cut by said cutter into a flat form, wherein an angle defined between the axis of the tubular elastomer and the guide surface of said development unit is adjustable in order to make a distance from a cut point at which the tubular elastomer is cut by said cutter to each lateral edge point at which the tubular elastomer begins to develop into a flat form equal to a distance from a particular point on the circumference of the tubular elastomer opposite the cut point to a middle end point of the tubular elastomer begins to develop into a flat form.

2. The apparatus as in claim 1, wherein said extruder extrudes the elastomeric material at an extrusion rate and said development unit develops the tubular elastomer at a feed rate, said development unit comprising means for varying said feed rate from the extrusion rate of said extruder to a rate 1.10 times the extrusion rate of said extruder.

* * * * *